(No Model.)
J. W. MARTIN.
BRAKE FOR VEHICLES.
No. 420,815. Patented Feb. 4, 1890.
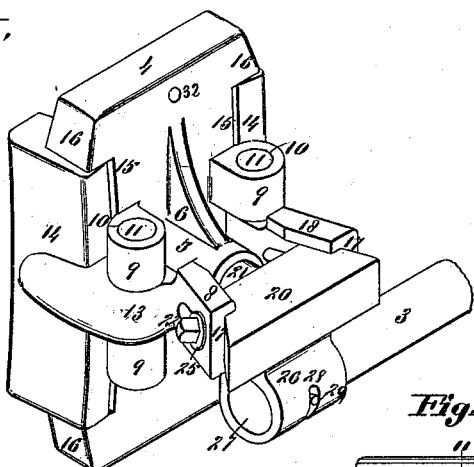
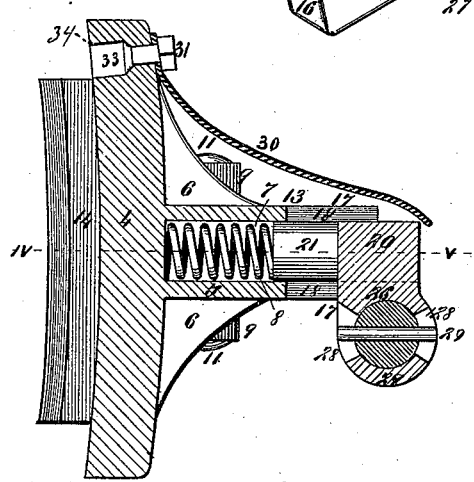
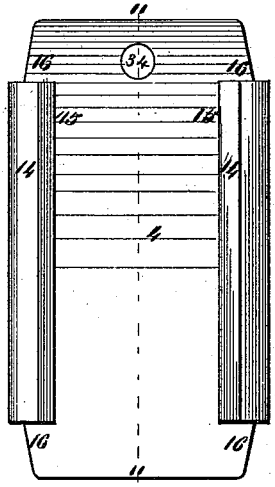
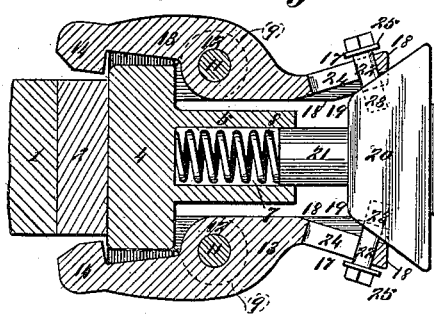
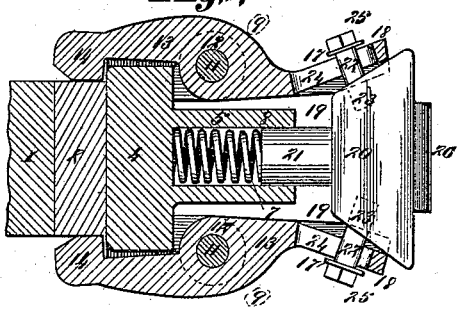
Attest:
Charles Pickles.
E. Arthur.
Inventor:
John W. Martin.
By Knight Bro's.
Atty's.

UNITED STATES PATENT OFFICE.

JOHN W. MARTIN, OF ST. LOUIS, MISSOURI, ASSIGNOR TO SAMUEL S. STEBBINS, OF SAME PLACE, AND THE HERCULES IRON WORKS COMPANY, OF EAST ST. LOUIS, ILLINOIS.

BRAKE FOR VEHICLES.

SPECIFICATION forming part of Letters Patent No. 420,815, dated February 4, 1890.

Application filed April 6, 1889. Serial No. 306,214. (No model.)

*To all whom it may concern:*

Be it known that I, JOHN W. MARTIN, of the city of St. Louis, in the State of Missouri, have invented a certain new and useful Improvement in a Combined Rubber Brake and Spring-Lock for Vehicles, of which the following is a full, clear, and exact description, reference being had to the accompanying drawings, forming part of this specification.

This invention relates to a device by means of which a slight pressure of the brake-lever brings the rubbers into frictional contact with the face of the tires, and a further pressure on said lever enforces the grip of lateral spring-jaws on the edges of the tires to effect an efficient lock.

Figure I is a perspective view of my combined rubber brake and spring-lock. Fig. II is a vertical section taken on line II II, Fig. III, and shows the spring that opens the locking-jaws and the self-adjusting pins in the coupling rock-shafts with their means of adjustment within the elongated slots of the shaft-bearings. Fig. III is a front view of the rubber and the locking-jaws. Fig. IV is a horizontal section taken on line IV V, Fig. II, and shows the frictional rubber in contact with the tire, but the spring-jaws of the lock not having yet enforced their grip; and Fig. V is a like view taken on the same line, and shows the jaws gripping the edge of the tire, and thereby effecting a positive lock.

Referring to the drawings, 1 represents the felly of a wheel of a vehicle to which my combined rubber brake and spring-lock is attached, and 2 is the tire that binds said wheel. 3 is the usual coupling pressure-bar that connects with and operates the brakes on both sides of the vehicle when actuated by any suitable lever-crank and connecting-rod, which need not be here shown or described, as no novelty is claimed thereon.

I will now describe my combined rubber or friction brake and spring-jaw lock that is actuated by said pressure-bar 3 under the impulse of the usual lever-crank movement at first as a friction-brake, in which the rubber alone is brought in contact with the face of the tire 2, as shown in Fig. IV, and as a positive clamping-lock when, by a further pressure on the operating-lever, the jaws are made to firmly grip the edges of said tire, as shown in Fig. V, and as will be hereinafter more fully described.

4 represents the friction-rubber, that, when operative, engages against the periphery or face of the tire, which rubber, as also the clamping-jaws and other parts of the device yet to be described, may be made of cast steel or iron or any other suitable material. Cast integral with said rubber plate and projecting from the rear side of the same is a boss-boxing 5, which is re-enforced above and beneath by the braces 6, which are also integral parts of the casting. A socket within said boss-boxing constitutes a spring-box 7, in which is housed the spiral push-spring 8.

Also cast integral with and at the rear of said rubber are four pivot-bearing lugs 9, in the perforate bearings 10 of which the pivot-pins 11 are seated, which pins are also seated in the perforations 12 of the co-operative pivoted locking-levers 13, which levers at their forward ends carry the clamping-jaws 14, which grip and lock the edges of the tire 2. The said jaws when operative work within the cut-aways or open slots 15 in the opposite edges of the cast rubber plate, so that the projections 16 at each end of the open slots serve as buffer-stays to withstand the traction force of the edges of the tires on the locking-jaws as the wheel tends to rotate.

17 represents flaring rear extensions of the pivoted locking-levers, that have flanged inwardly-turned edges 18 both above and below, which flanged flaring extension of said lever provides a bevel-boxing 19, within which the bevel drive-head 20 of the push-pin 21 works. The said bevel drive-head is retained to its work in said bevel-boxing and is withheld from jumping the track (as it would otherwise have a tendency to do under the influence of the push-spring) by the combined stay and guide screw-bolts 22, which are screw-seated at 23 in said bevel-heads and project through and slide in the elongated guide-slots 24 in the flaring extensions 17 of the pivoted levers that carry and actuate the clamping or locking jaws.

Washers 25, seated on and just inside the head of the stay-bolts 22, prevent the intrusion or frictional abrasion of the heads of said stay-bolts along the margins of the guide-slots 24 when the bevel-head of the push-pin expands the rear ends of the pivoted levers 13, that carry the locking-jaws, and thereby make the jaws grip the edges of the tire and effect the lock. The said stay-bolts not only hold the bevel-head 20 captive within the slideway-boxing 19, but also hold the push-pin 21 of said head from being thrown by the push-spring from its socket-seat in the spring-box 7.

26 represents a pendent journal-box that projects from the lower side of the bevel-head 20, with which it is cast integral, which journal-box incloses the journal-bearing 27, in which the coupling pressure-bar 3 is seated, the said bar having loose bearings therein, as also in that of the duplicate combined brake and lock on the other side of the vehicle, both of which the bar simultaneously operates.

28 represents radial slots on both the front and rear sides of said journal-box, which pass clear through to the journal-bearings, and 29 is a self-adjustable stay-pin that is seated in a perforation in the pressure-bar near the end, the ends of which pin project from the bar sufficiently to be flush with the outside of said radial slots. The said pins in the journal-boxes 26 of the duplicate locks on each side of the vehicle prevent the longitudinal withdrawal of the pressure coupling-bar 3. The radial slots 28 in said journal-boxes provide for the pins free scope to travel to accommodate themselves to the rock tarving of the rubber when it is either below or above the middle of the wheel.

A splatter-shield 30, secured by a tapped screw-bolt 31, which is secured in its perforate seat 32 in said shield and in the rubber plate, protects the actuating devices that operate the levers of the locking-jaws from the mud and dirt that splatters from the wheels, the said bolt being fastened by the stay-nut 33, seated in the bevel-socket 34.

The operating-lever, actuating-crank, and connecting-rod (not shown) may be of any suitable and usual construction well known in vehicle brakes and locks.

The operation of the invention is as follows: When the vehicle is traveling down on but a slight inclination and is lightly loaded, it is generally only required to use the rubber brake, which is effected by a slight pressure on the operating-lever, which brings the friction-rubber against the face of the tire, and thereby retards its rotation, but does not lock it from turning; but this is not a sufficient brake when descending steep hills with a heavy load. The driver or operator therefore exerts more pressure on the lever, which, after the rubber is stayed by the tire, forces the wedge-shaped bevel-head 20 and the pin that projects therefrom, the latter into the spring-box to retire the push-spring and the former between the flaring rear extensions of the pivoted levers 13, which carry the locking-jaws, which thereby are forced to effect a firm grip of the edges of the tire, so as to maintain a positive lock, in which position the usual ratchet-segment holds the operating-lever, and through it the lock, until released by the driver's letting free the lever from the ratchet-segment and the consequent relaxing of the locking-jaws under the influence of the released push-spring, which throws back the pin 21 and its bevel-head 20 until stopped by the arrival of the stay-bolts 22 at their extreme limits in the guide-slots 24, the heads of said bolts by said action drawing inward the rear extremities of the pivoted levers, and thus expanding and releasing the jaws from the tire.

I will now explain more fully the action of the self-adjusting stay-pins 29 in their radial slots 28 and the advantages and almost necessity of said self-adjusting device in connection with the combined brake and lock.

When locks are attached to springless vehicles, it is easy to adjust the rubber or lock to the level of the middle of the wheel; but with spring-vehicles, which largely outnumber the springless ones, especially in the large cities, the respective position of the rubber or lock as regards the wheel is largely varied, according to whether the vehicle is empty, lightly loaded, or carrying a full load, for it is evident that when fully loaded the springs will be more depressed than with a half-load and much more than when empty, and the rubber or lock follows suit, coming into contact below the maximum diametric projection of the wheel. Thus when the vehicle is heavily loaded the lower ends of the rubber and spring-jaws of the lock accommodate themselves to the under curve of the wheel immediately after the upper end of the rubber comes in contact, which it does in the first process of applying the brake before the locking-jaws are sprung. Now were it not for the radial slots 28, in which the pins 29 have freedom to travel when the face of the rubber and the jaws, when the vehicle is heavily loaded, are rocked or tarved to an underhung position to accord with the under curve of the wheel, there would be much danger of breaking the lock, which adverse condition is entirely obviated by my radial slots 28, that admit of free self-adjustment of the pins 29. For the lack of said means of self-adjustment with heavily-laden spring-vans traveling down steep declivities at the times of the greatest adverse conditions, which are the times of greatest danger, the locks have frequently broken, frequently with very disastrous consequences.

I claim as my invention—

1. In a vehicle brake and lock, the combination of the vertical pivoted locking-levers having bevel slotway-extensions, the clamping-jaws carried thereby and adapted to engage on the edges of the tire to effect the lock, and the bevel wedge-shaped header that is forced by the pressure-bar along the bevel slotway-extensions of said pivoted locking-levers arranged to expand the same, and thus enforce the grip of the jaws on the edges of the tire, substantially as described, and for the purpose set forth.

2. In a vehicle brake and lock, the combination of the vertical pivoted locking-levers having bevel slotway-extensions, the clamping-jaws carried thereby and adapted to engage the edges of the tire to effect the lock, the friction-rubber 4, provided with open cutaways 15 in its side edges, in which said jaws are housed when closed, the projecting abutting lugs 16 at each end of said open slots arranged to hold the jaws against the adverse friction-drag of the wheel, and the bevel wedge-shaped header that is forced by the pressure-bar along the bevel slotway-extensions of said pivoted locking-levers arranged to expand the same, and thus enforce the grip of the jaws on the edges of the tire, substantially as set forth.

3. In a vehicle brake and lock, the combination of the rubber that engages with the face of the tire, the pivot-bearing lugs 9 at the back of said rubber plate, the pivoted locking-levers whose pivots work in the bearings in said lugs, the bevel boxing-extensions at the rear of said locking-levers, the said boxing being provided with elongated guide-slots 24, the bevel-header 20, the stay screw-bolts 22, whose points are seated in said bevel-header, and which bolts travel in said guide-slots, the said bevel-header arranged to travel in the bevel-boxing attached to the locking-levers to expand the same, and thus enforce the grip of the locking-jaws, and arranged, when said bevel-head is withdrawn by means of the heads of the bolts 22, to draw in the rear ends of the pivoted locking-levers, and thus expand and release the jaws, substantially as described, and for the purpose set forth.

4. In a vehicle brake and lock, the combination of the rubber, the boss-boxing at the back of said rubber, the push-spring in the socket of said boss-boxing, the pivot-bearing lugs 9, that project from the back of said rubber, the pivoted locking-levers whose pivots engage in said bearing-lugs, the vertical clamping-jaws 14, the bevel-boxes, rear extensions of said locking-levers, the bevel-header 20, that works in the bevel-boxed extensions of said levers to expand and contract the jaws, and the push-pin 21, integral with the bevel-header, which push-pin engages with and is engaged by the spiral push-spring 8, substantially as and for the purpose set forth.

5. In a vehicle brake and lock, the combination of the pivoted locking-levers, the clamping-jaws they carry, the bevel-boxed extensions at the rear of said locking-levers, the bevel-headers that engage in said boxing to operate the jaws, the journal-box 26, integral with said bevel-header, in which journal-box the pressure-bar 3 has its bearings, the said journal-box being provided with radial slots 28, the pressure coupling-bar 3, and the self-adjusting stay-pins 29, that work in said radial slots, substantially as described, and for the purpose set forth.

6. In a vehicle brake and lock, the combination of the rubber plate, the boss-boxing 5 at the rear of said rubber, the push-spring in the socket of said boxing, the pivot-bearer lugs 9 at the rear of the rubber plate, the pivoted locking-levers that have bearings in said lugs, the clamping-jaws that said levers carry, which jaws work within open slots or cutaways in the side edges of the rubber plate, the projections 16 at the ends of said open slots on the ends of the rubber plates, which projections box in the jaws when gripping and brace them against the traction draw of the tire, the flaring boxed extensions at the rear of the pivoted locking-levers, the bevel-header that works within said flaring boxing, the pin from said bevel-header, which pin works in the socket of the boss-boxing 5 and pushes and is pushed by the spiral spring 8, the said boxing provided with elongated guide-slots 24, the screw-bolts 22, whose points are seated in said bevel-headers and which travel in said guide-slots, arranged to expand and contract the locking-jaws when actuated by the operating-lever, substantially as described, and for the purpose set forth.

JOHN W. MARTIN.

In presence of—
BENJN. A. KNIGHT,
SAML. KNIGHT.